United States Patent [19]

Haferl

[11] Patent Number: 4,563,618
[45] Date of Patent: Jan. 7, 1986

[54] S-CORRECTED DEFLECTION CIRCUIT

[75] Inventor: Peter E. Haferl, Adliswil, Switzerland

[73] Assignee: RCA Corporation, Princeton, N.J.

[21] Appl. No.: 716,685

[22] Filed: Mar. 27, 1985

[30] Foreign Application Priority Data

Apr. 4, 1984 [GB] United Kingdom ............... 8408694

[51] Int. Cl.[4] ............................................. H01J 29/56
[52] U.S. Cl. .................................................. 315/370
[58] Field of Search ........................ 315/370, 371, 399

[56] References Cited

U.S. PATENT DOCUMENTS 2,817,788 12/1957 Landon et al. .
2,916,665 12/1959 Schlesinger .
3,401,300 9/1968 Pichler .
3,428,853 2/1969 Akatsu .
3,751,707 8/1973 Greiner et al. .
4,176,303 11/1979 Babock .
4,181,874 1/1980 Babock .

*Primary Examiner*—Theodore M. Blum
*Attorney, Agent, or Firm*—Eugene M. Whitacre; Paul J. Rasmussen; Joseph J. Laks

[57] ABSTRACT

The faceplate of a square-planar picture tube is relatively flat, with a curvature along the major axis and lines parallel thereto that is generally greater near the left and right edges than in the center. An LC tuned circuit, coupled to the deflection winding, has a resonant period of oscillation approximately half that of the line trace interval. The tuned circuit introduces an oscillatory correction component into the trace current that provides additional S-shaping in that portion of the line scan intermediate the center and the left or right edge.

15 Claims, 4 Drawing Figures

S-CORRECTED DEFLECTION CIRCUIT

This invention relates to S-correction for deflection circuits.

Cathode ray tubes for video apparatus such as television receivers or computer monitors require symmetrical linearity correction to the deflection current, referred to as S-correction, in order to correct for the difference between the beam scanning radius of curvature and the tube faceplate radius of curvature. New, flatter faceplate tubes having nonspherical faceplate curvatures require a more complex form of S-correction than is provided with a conventional spherical faceplate cathode ray tube.

A tube of the type having a complex curvature faceplate is described in the following U.S. patent applications, herein incorporated by reference.

1. U.S. patent application Ser. No. 469,772, filed Feb. 25, 1983, in the name of F. R. Ragland, Jr. and entitled, CATHODE-RAY TUBE HAVING AN IMPROVED SHADOW MASK CONTOUR.

2. U.S. patent application Ser. No. 469,774, filed Feb. 25, 1983 in the name of F. R. Ragland, Jr. and entitled, CATHODE-RAY TUBE HAVING A FACEPLATE PANEL WITH A SUBSTANTIALLY PLANAR PERIPHERY.

3. U.S. patent application Ser. No. 469,775, filed Feb. 25, 1983, in the names of R. J. D'Amato et al., and entitled, CATHODE-RAY TUBE HAVING DIFFERENT CURVATURE ALONG MAJOR AND MINOR AXES.

4. U.S. patent application Ser. No. 529,644, filed Sept. 6, 1983, in the names of R. J. D'Amato et al., and entitled, CATHODE-RAY TUBE HAVING A FACEPLATE PANEL WITH AN ESSENTIALLY PLANAR SCREEN PERIPHERY.

In one form of flatter faceplate tube, as typified by the RCA 110° COTY-SP, square-planar, 27V, color TV picture tube, A68ACC10X, the formula for the tube faceplate sagittal height, z, in millimeters, with reference to the center of the faceplate is given by:

$$Z = A_1 X^2 + A_2 X^4 + A_3 Y^2 + A_4 X^2 Y^2 + A_5 X^4 Y^2 + A_6 Y^4 + A_7 Y^2 4 + A_8 X^4 Y^4,$$

where X and Y are the distance coordinates, in millimeters, from the faceplate center along the major and minor axes, respectively, and where:

$A_1 = -0.236424229 \times 10^{-4}$
$A_2 = -0.363538575 \times 10^{-8}$
$A_3 = -0.422441063 \times 10^{-3}$
$A_4 = -0.213537355 \times 10^{-8}$
$A_5 = +0.883912220 \times 10^{-13}$
$A_6 = -0.100020398 \times 10^{-9}$
$A_7 = +0.117915353 \times 10^{-14}$
$A_8 = +0.527722295 \times 10^{-21}$ The picture tube faceplate defined by this formula has a relatively shallow curvature near the center of the faceplate, which increases near the edges along paths parallel to both the major and minor axes of the tube. The overall result is a faceplate of relatively flat appearance and with planar edges, namely, with points along the top, bottom, right and left edges located substantially in a common plane. Such a picture tube produces symmetrical raster distortion during a line scan that cannot be corrected by conventional S-shaping means used in conjunction with tubes having spherical faceplate contours.

In accordance with a feature of the invention, an S-corrected line deflection circuit for a picture tube includes a line deflection winding and an S-shaping capacitance coupled thereto. A trace switch coupled to the line deflection winding and operated at a line deflection rate generates a trace current during a trace interval of a line deflection cycle. The trace current is a generally sawtooth current modified in accordance with the waveshaping provided by the S-shaping capacitance. A resonant circuit is tuned to generate a generally sinusoidal correction current during the line trace interval. The resonant circuit is coupled to the line deflection winding for providing additional modification of the sawtooth trace current in accordance with the correction current.

In carrying out the invention, the resonant circuit is a LC circuit that generates a sinusoidal correction current having a period of oscillation approximately half that of the trace interval. In providing S-correction for a picture tube having a generally flat contoured faceplate that is aspherical, the tuned circuit introduces an oscillatory correction current into the trace current that has a di/dt with a sign value opposite that of the di/dt of the component of the trace current introduced by the S-shaping capacitance, in those portions of the line scan intermediate the center and left and right edges.

Figure 1:
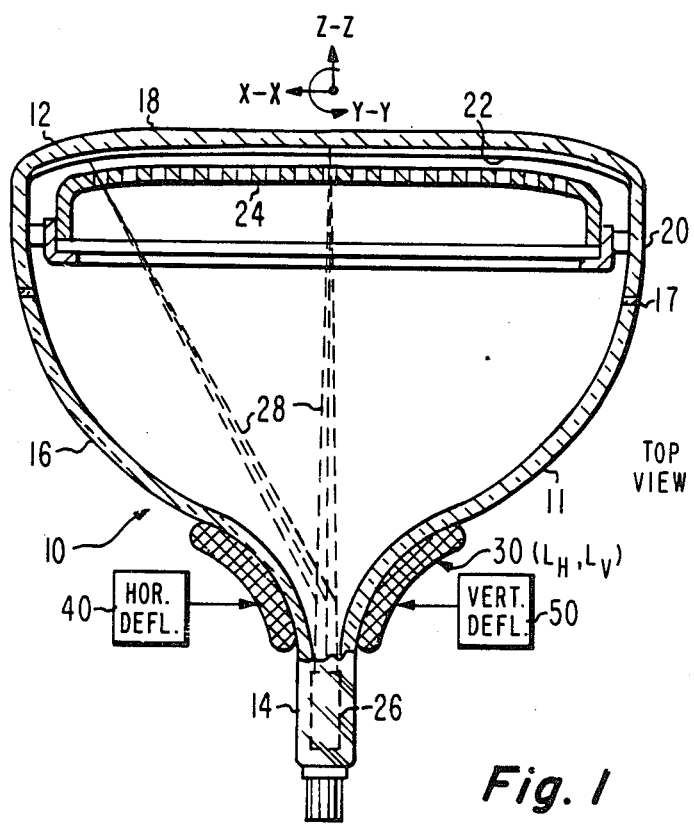
FIG. 1 illustrates a top view, partially in breakaway, of a square-planar color picture tube that uses an S-corrected line deflection circuit embodying the invention.

FIG. 1 illustrates a color picture tube 10 of the square-planar type. Picture tube 10 has a glass envelope 11 comprising a generally rectangular faceplate panel 12 and a tubular neck 14 connected by a funnel 16. Panel 12 comprises a viewing faceplate 18 and a peripheral flange or side wall 20, which is sealed to funnel 16 by a glass frit 17. A generally rectangular 3-color cathodoluminescent phosphor screen 22 is carried by the inner surface of faceplate 18. The screen is preferrably a line screen, with the phosphor lines extending substantially parallel to the minor or vertical axis Y—Y of the tube (a direction normal to the plane of FIG. 1). Alternatively, the screen may be a dot screen. A multi-aperture color selection electrode or shadow mask 24 is removably mounted within faceplate panel 12 in predetermined spaced relation to screen 22. An electron gun 26, shown schematically by dotted lines in FIG. 1, is centrally mounted within neck 14 to generate and accelerate three electron beams 28 along convergent paths through mask 24 to screen 22.

Picture tube 10 is designed to be used with an external magnetic deflection yoke 30, schematically illustrated in FIG. 1 as surrounding neck 14 and funnel 16 in the neighborhood of their junction. Horizontal deflection coils $L_H$ and vertical deflection coils $L_V$ of deflection yoke 30 are coupled to a horizontal deflection circuit 40 and a vertical deflection circuit 50, respectively, for generating respective line and field deflection currents. The line and field deflection currents subject the three electron beams 28 to vertical and horizontal magnetic flux that scans the beams horizontally in the direction of the major or horizontal axis X—X and vertically in the direction of the minor axis Y—Y, in a rectangular raster pattern over screen 22. The longitudinal axis of picture tube 10 is labeled Z—Z in FIG. 1.

The faceplate 18 of a square-planar color picture tube 10 is relatively flat. The curvature of the faceplate is complex and may be approximated in accordance with the the polynominal expression given above. In the line scanning direction, or as the electron beams are scanned from left edge to right edge, horizontally, the curvature of the faceplate decreases from left edge to center and then increases again to the right edge.

Figure 2:
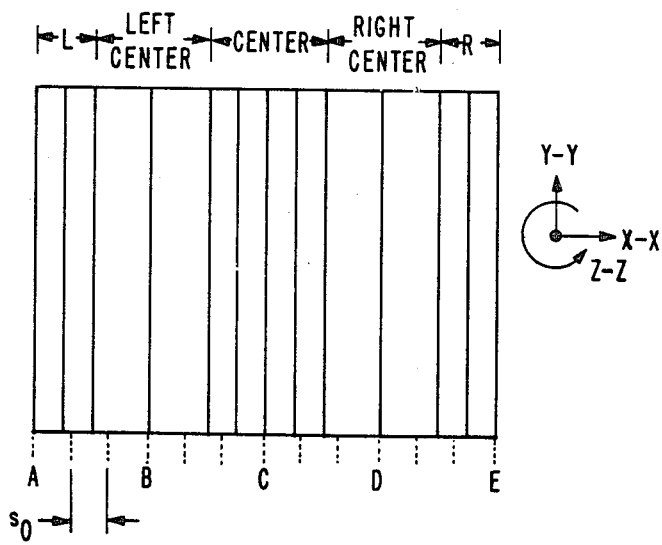
FIG. 2 illustrates a display of vertical lines on the faceplate of the picture tube of FIG. 1 showing residual S-shaping error that may occur when using a conventional line deflection circuit.

Because of the change in curvature of the faceplate surface, conventional S-shaping techniques provide inadequate correction of symmetrical, geometrical linearity distortion. Consider a situation in which a pattern of equally spaced vertical lines is displayed on the screen of the square-planar color picture tube of FIG. 1 using a conventional horizontal deflection circuit that provides S-correction only by means of an S-shaping capacitor. Because the curvature of the faceplate during a given line scan increases from the center region to the left and right edges, the S-shaping produced by the S-capacitor cannot correct for the error introduced by the faceplate geometry at all points along the line scan. At best, a compromise situation may be obtained, wherein, by proper selection of the S-capacitor value, linearity of line scan may be obtained in the center region and at the left and right edges. Residual distortion will remain in the intermediate regions in the left-center and right-center. Such a situation is illustrated in FIG. 2 wherein a pattern at equally spaced vertical lines, separated by an average distance $s_0$, are displayed in the center region and in the left and right sides L and R, separated by one given distance, whereas they are displayed in the left-center and right-center regions separated by another, greater distance. The short, dotted-line, vertical tick marks of FIG. 2 indicate the ideal locations of the vertical lines when complete S-correction is provided. The nonlinearity, wherein, for example, the display of vertical lines appears compressed around the center and at the left and right sides, while it appears expanded inbetween, is a result of the nonspherical shape of the faceplate of the square-planar picture tube of FIG. 1 and cannot be corrected by changing the value of the S-capacitor.

Figure 3:
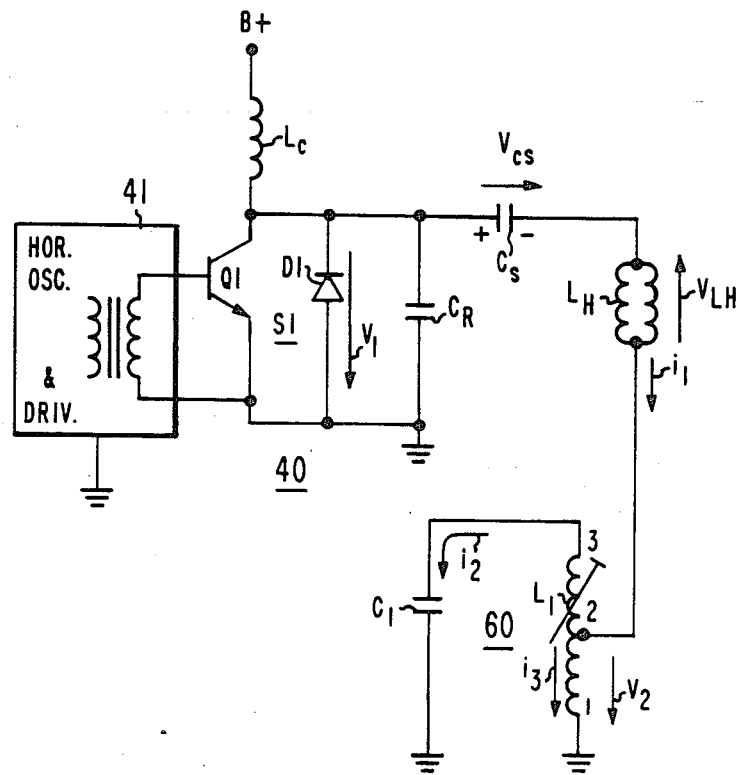
FIG. 3 illustrates an S-corrected line deflection circuit embodying the invention.

The residual non-linearity caused by the faceplate geometry may be corrected by using horizontal deflection circuit 40, of FIG. 3, embodying the invention. Horizontal deflection circuit 40 includes a horizontal oscillator and driver circuit 41, a trace switch S1, comprising a horizontal output transistor Q1 and a damper diode D1, a retrace capacitor $C_R$ and the series connection of an S-shaping capacitor $C_s$ and a horizontal deflection winding $L_H$.

Horizontal oscillator and driver 41 operates trace switch S1 at the line deflection rate for generating a trace current component of the line deflection current $i_1$ of FIG. 4b during the trace interval, between times $t_1$–$t_7$, and a retrace current component during the retrace interval, between times $t_7$–$t_8$. When trace switch S1 is nonconductive during the retrace interval, a retrace pulse voltage $V_1$, illustrated in FIG. 4a, is developed across retrace capacitor $C_R$. The energy stored in an input choke $L_c$, coupled between a B+ terminal and trace switch S1, replenishes line deflection losses.

The trace current in deflection winding $L_H$ is generally a sawtooth current modified in accordance with the waveshaping provided by S-capacitor $C_s$. S-capacitor $C_s$ and deflection winding $L_H$ form a first resonant branch circuit, resonant at a frequency lower than the line deflection frequency, illustratively, $f_H = 15.625$ kilohertz. Typically, the resonant frequency $f_{cs}$ of the S-capacitor-line deflection coil branch circuit is between 6 and 8 kilohertz for 110° deflection.

When using only an S-capacitor for current waveshaping in a 110° deflection, square-planar color picture tube having a faceplate curvature that is greater at the left and right edges than the curvature in the center, proper S-correction cannot be achieved at all points along the line scan. A current waveshape similar to the dashed-line current waveform $i_1'$ of FIG. 4b is produced when only an S-capcitor is used for S-correction. The slope, or di/dt of the deflection current determines the distance between displayed lines of a video signal of an equally spaced vertical line pattern. Using only an S-capacitor, incomplete S-correction is provided by the current $i_1'$. The solid-line waveform $i_1$ represents the desired current waveform. The di/dt of the dashed-line current $i_1'$ in the left-center and right-center regions is excessive, resulting in an expanded display in those regions relative to the display in the remaining regions.

In accordance with a feature of the invention, a tapped resonant circuit 60 provides an additional degree of S-correction to produce an S-corrected deflection current waveform $i_1$ of FIG. 4b that is substantially corrected at all points in the line scan. Resonant circuit 60 comprises a first capacitive branch $C_1$ coupled to a second inductive branch at a terminal 3 of inductor $L_1$. The S-capacitor-deflection winding branch is connected to resonant circuit 60 at a terminal 2, a tap terminal of inductor $L_1$.

By means of adjustable inductor $L_1$, resonant circuit 60 is tuned to have a resonant period of half the trace interval duration, or a resonant frequency $f_0$ of 38 kilohertz, illustratively, when the trace interval is 52.8 microsecond in duration. This produces two cycles of oscillation of the current $i_2$ in the capacitive branch $C_1$, during the trace interval. As illustrated in FIG. 4c, the oscillation of current $i_2$ is symmetrically located relative to the center of trace, time $t_4$.

Figure 4:
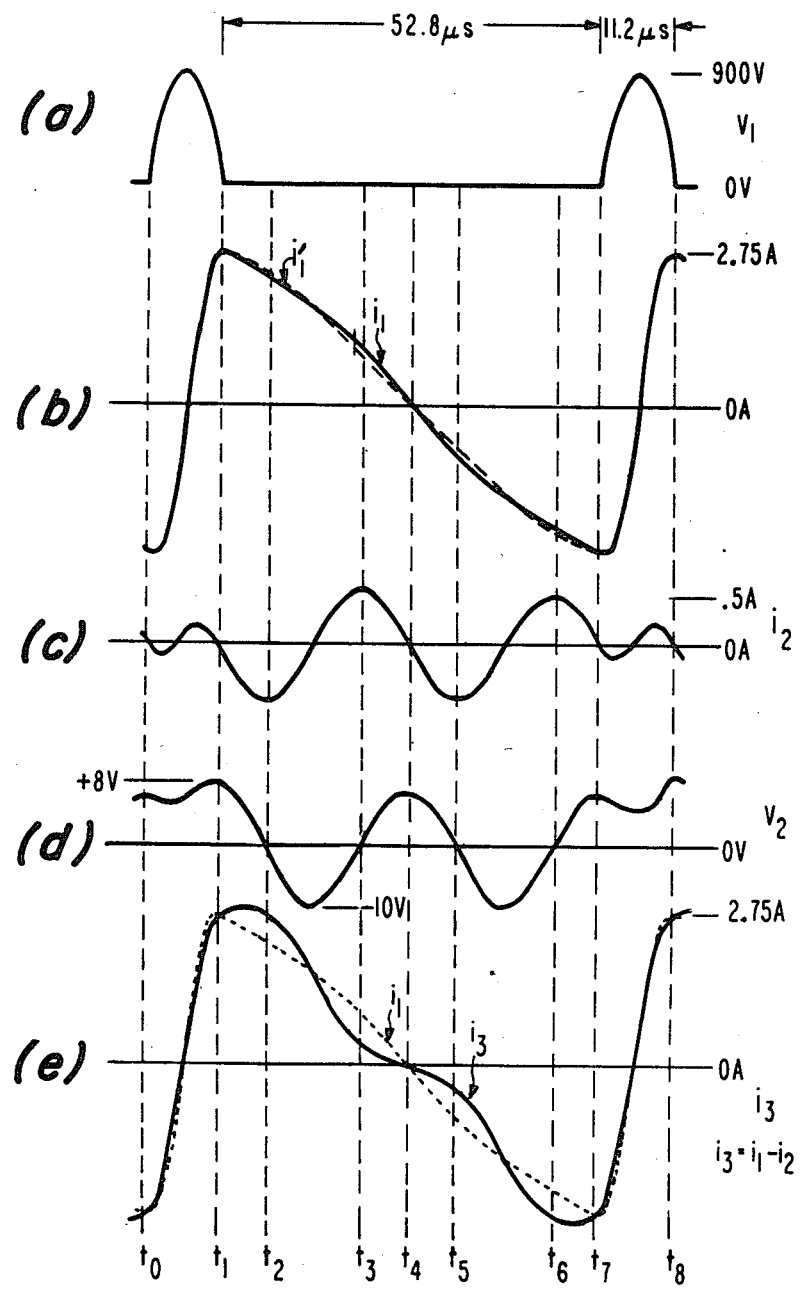
FIGS. 4(a)–4(e) illustrate waveforms associated with the operation of the circuit of FIG. 3.

During the retrace interval, the deflection retrace resonant circuit of $L_H$, $C_R$ drives resonant circuit 60 with the deflection retrace current, producing approximately one cycle of oscillation of current $i_2$ during retrace, between times $t_7$ and $t_8$ of FIG. 4c. Proper phasing between the two cycles of current oscillation during trace and the one cycle of current oscillation during retrace is achieved due to the fact that current $i_2$ becomes approximately zero at the beginning and end of the trace interval, at times $t_1$ and $t_7$, respectively of FIG. 4c. To provide symmetrical correction relative to the center of trace, it is desirable for the current $i_2$ to have substantially the same phase at the beginning of trace, times $t_1$ and $t_8$ of FIG. 4, as at the end of trace, times $t_0$ and $t_7$. The amplitude of current $i_2$ is determined by the value of inductor $L_1$.

As just described, the phase, frequency and amplitude of current $i_2$ provides the proper modulation of the deflection current waveshaping provided by S-capacitor $C_s$ to produce a resultant deflection current waveform $i_1$ of FIG. 4b having the required waveshape for correcting the geometrical line scan nonlinearities of a square-planar picture tube. The voltage $V_{LH}$ applied across deflection winding $L_H$ during trace is the sum of the S-capacitor voltage $V_{cs}$ and the voltage $V_2$ between terminals 2 and 1 of inductor $L_1$. Thus, $V_{LH} = V_{cs} + V_2$.

The voltage $V_2$, illustrated in FIG. 4d, lags the current $i_2$ by 90° during trace, and is therefore proportional to $-di_2/dt$. Thus $V_{LH} = -L_H di_1/dt = V_{cs} + k\ di_2/dt$, where k is a constant.

From the above, one notes that the S-capacitor voltage component $V_{cs}$ of the voltage applied to deflection winding $L_H$ contributes or introduces a current component during trace similar in waveshape to the dashed-line current $i_1'$ of FIG. 4b. Tuned circuit 60 introduces a component $V_2$ to the applied deflection winding voltage that introduces a slope component to the deflection current slope that is proportional to $di_2/dt$.

When current $i_2$ of FIG. 4c is ramping downward, such as from time $t_1$ to $t_2$, time $t_3$ to $t_5$, and time $t_6$ to $t_7$, current $i_2$ produces an increased slope to the deflection current $i_1$ over that contributed by the dashed-line S-capacitor current component $i_1'$. In these intervals the display is expanded.

When current $i_2$ of FIG. 4c is ramping upward, such as in the left-center and right-center regions of line scan, from time $t_2$ to $t_3$ and from time $t_5$ to $t_6$, the di/dt or slope of current $i_2$ opposes the di/dt of the dashed-line S-capacitor current component $i_1'$. In these regions, the slope of deflection current $i_1$ is decreased, producing a compression of the display.

Ideally, neglecting dissipative damping effects, the maxima, minima and zero-crossings of the current and voltage waveforms $i_2$ and $V_2$ of FIGS. 4c and 4d are equally separated in time during the line trace interval.

FIG. 4e illustrates current $i_3$ flowing in inductor $L_1$ from terminal 2 to terminal 1. The flat portions of current $i_3$ indicate an increased di/dt to the deflection current $i_1$. The steep portions indicate a decreased di/dt.

As previously mentioned, LC resonant circuit 60 is tuned to make two complete cycles of oscillation during the trace interval. The frequency of the S-capacitor contribution to deflection circuit $i_1$ during trace is much lower, approximately 7.5 kilohertz, than the frequency of ringing current $i_2$, approximately 38 kilohertz. The deflection current, therefore, does not contribute to the ringing current excitation during trace.

The energy which circulates in tuned circuit 60 is replenished during the second half of retrace as illustrated in FIG. 4c wherein the maxima of current $i_2$ during retrace is of greater magnitude than the minima of the current. The average of the voltage $V_2$ increases towards the end of retrace, as illustrated in FIG. 4d. The increase indicates the added energy during the second half of retrace. It should also be noted that, although not readily apparent in the waveform illustrations, the amplitudes of current $i_2$ and voltage $V_2$ decrease slightly toward the end of trace due to incurred losses.

Since LC resonant circuit 60 is tuned such that current $i_2$ produces two cycles of oscillation during the trace interval, current $i_2$ has the same phase at times $t_1$ and $t_7$. In contrast, the S-capacitor contribution to deflection current $i_1$ produces only about one-half cycle of oscillation during trace. As a result, the deflection current has a phase at time $t_7$ that is opposite the phase at time $t_1$. The two currents $i_1$ and $i_2$, therefore, have opposite phases at time $t_7$. This observation is supported by noting that voltage $V_2$ of FIG. 4d starts to decrease at time $t_7$, while voltage $V_1$ of FIG. 4a starts to increase at time $t_7$.

The high $di_1/dt$ of deflection current $i_1$ shifts the phase of current $i_2$ by 360 degrees during each retrace period. The opposite phase of current $i_1$ at time $t_7$ and its high positive $di_1/dt$ during retrace causes a rapid decrease of current $i_2$ to its zero crossing point during retrace. The time of zero crossing depends upon the Q of tuned circuit 60 and upon the amount of energy circulating in circuit 60 compared to the amount of circulating deflection energy. For example, a damping resistor, hypothetically placed in parallel with capacitor $C_1$, results in an earlier zero crossing because the amplitude of current $i_2$ is smaller at time $t_7$ and thus it takes less time to phase shift current $i_2$. During the remainder of retrace, namely, during the interval between the zero crossing point of current $i_2$ and time $t_8$, current $i_2$ charges capacitor $C_1$ positively relative to ground. During this interval, current $i_2$ is proportional to $di_1/dt$ and returns to zero at time $t_8$.

In this manner, the phase of current $i_2$ is set at time $t_8$ or time $t_1$ such that current $i_2$, which rings independently during trace, starts from substantially zero and is negative going. Then, by tuning LC resonant circuit 60 to provide two cycles of oscillation during trace, the phase of current $i_2$ becomes equal at times $t_1$ and $t_7$.

A tapped coil $L_1$ provides better isolation between currents $i_1$ and $i_2$ and results in a better Q of circuit 60 than without the tap. During retrace, the remainder of deflection circuit 40 loads tuned circuit 60 and reduces the Q of circuit 60. A high Q of circuit 60 is advantageous for providing symmetrical S-correction. A low Q results in a stronger decrease of the amplitudes of current $i_2$ and voltage $V_2$ towards the end of trace, and results in less S-correction at the right side of the screen than at the left side.

By proper selection of S-capacitor value, to provide slight overcorrection or compression of the display at the center and left and right edges of line scan, and to provide slight undercorrection or expansion at the left and right-center areas, tuned circuit 60 may be used to introduce a compensating correction current component $i_2$ that opposes the over and undercorrection provided by S-capacitor $C_s$ to substantially linearize the display over the entire line scan.

When tuned circuit 60 is added to deflection circuit 40 of FIG. 3, the vertical line pattern of FIG. 2 changes to one of equally spaced lines located at the tick mark positions. Vertical lines A through E do not change their locations since points on these lines correspond to line scanning instants when current $i_2$ is zero.

The addition of tuned circuit 60 results in a small reduction of the line deflection current due to the added impedance. This reduction may be compensated by the width control adjustment circuitry of the line deflection circuit, not illustrated in FIG. 3.

The values of circuit components in FIG. 3 are as follows:

```
C_R = 13,000 picofarad
C_s = 0.47 microfarad
L_H = 1 millihenry, 1 ohm
C_1 = 0.047 microfarad
L_1 = 400 microhenry between terminals 3 and 1
    = 16 microhenry between terminals 2 and 1.
```

The color picture tube is a 110°, 27V, COTY-SP Color Picture Tube, A68ACC10X, manufactured by RCA Corporation, Video Component and Display Division, Lancaster, Pa.

The amount R of residual S-distortion present when using only the S-capacitor equals approximately 7%, as measured by the greatest deviation of two vertical lines in FIG. 2 from the average spacing $s_0$, where $$R = (s_{max} - s_0)/s_0 \times 100\%,$$

and where $s_{max}$ equals the greatest spacing between two vertical lines.

Tuned circuit 60 supplies additional S-correction in the amount G. Empirically, it has been found that when the ratio between the inductance of the lower portion of inductor $L_1$ and the inductance of horizontal deflection winding $L_H$ equals approximately 0.016 the correct amount of additional S-correction has been provided.

What is claimed:

1. An S-corrected line deflection circuit, comprising:
   a line deflection winding;
   an S-shaping capacitance coupled to said line deflection winding;
   a trace switch coupled to said line deflection winding and operated at a line deflection rate for generating a trace current in said line deflection winding during a trace interval of a line deflection cycle and a retrace current during a retrace interval, said trace current being a generally sawtooth current modified in accordance with the waveshaping provided by said S-shaping capacitance; and
   a resonant circuit tuned to generate a generally sinusoidal correction current during the line trace interval that has a period of oscillation half that of the trace interval, said resonant circuit being coupled to said line deflection winding for providing additional modification of the sawtooth trace current in accordance with said correction current.

2. An S-corrected line deflection circuit according to claim 1 wherein said correction current provides correction for line deflection nonlinearity introduced by raster scanning in a picture tube with an aspherical faceplate having a curvature that is different at the side edges than in the center.

3. An S-corrected line deflection circuit according to claim 1 wherein said correction current undergoes two cycles of oscillation during the trace interval of said line deflection cycle and undergoes one cycle of oscillation during the retrace interval.

4. An S-corrected line deflection circuit according to claim 3 wherein said correction current provides correction for line deflection nonlinearity introduced by raster scanning in a picture tube with an aspherical faceplate having a curvature that is different at the side edges than in the center.

5. An S-corrected line deflection circuit according to claim 1 wherein the retrace current from said line deflection winding rephases said correction current during said retrace interval to enable the phase of said correction current to be the same at the beginning and end of said trace interval.

6. An S-corrected line deflection circuit according to claim 5 wherein said correction current provides correction for line deflection nonlinearity introduced by raster scanning in a picture tube with an aspherical faceplate having a curvature that is different at the side edges than in the center.

7. An S-corrected line deflection circuit according to claim 1 wherein said line deflection winding and S-shaping capacitance are series-connected to form a first branch, and wherein said resonant circuit comprises a first capacitive branch coupled to a second inductive branch at a juncture, said deflection winding being coupled to said juncture.

8. An S-corrected line deflection circuit according to claim 7 wherein said correction current provides correction for line deflection nonlinearity introduced by raster scanning in a picture tube with an aspherical faceplate having a curvature that is different at the side edges than in the center.

9. An S-corrected line deflection circuit according to claim 7 wherein the retrace current from said line deflection winding produces a rapid charging in said capacitive branch to provide one cycle of correction current oscillation during said retrace interval.

10. An S-corrected line deflection circuit according to claim 9 wherein said correction current provides correction for line deflection nonlinearity introduced by raster scanning in a picture tube with an aspherical faceplate having a curvature that is different at the side edges than in the center.

11. An S-corrected line deflection circuit according to claim 7, wherein said inductive branch comprises a tapped coil, said line deflection winding being coupled to said juncture via the tap of said coil.

12. In a television display apparatus having a picture tube that includes an electron gun structure for generating and accelerating an electron beam to strike a phosphor screen located on an aspherical faceplate of the picture tube, wherein said faceplate is of relatively flat contour having a curvature that is generally greater at the left and right edges than in the center, an S-corrected line deflection circuit, comprising:
   a line deflection winding;
   a S-shaping capacitance coupled to said line deflection winding;
   a trace switch coupled to said line deflection winding for generating therein a trace current during a trace interval of a line deflection cycle to line scan said electron beam across said phosphor screen between the left and right edges of said faceplate; and
   an LC tuned circuit coupled to said deflection winding for introducing an oscillatory correction current component into the trace current that has a di/dt with a sign value opposite that of the di/dt of the component of the trace current introduced by said S-shaping capacitance in that portion of the line scan intermediate the center and a left or right edge to correct residual S-distortion during the line scan between the left and right edges of said aspherical faceplate.

13. An S-corrected line deflection circuit, comprising:
   a line deflection winding;
   an S-shaping capacitance coupled to said line deflection winding;
   a trace switch coupled to said line deflection winding and operated at a line deflection rate for generating a trace current in said line deflection winding during a line trace interval of a line deflection cycle and a retrace current during a line retrace interval, said trace current being a generally sawtooth current modified in accordance with the waveshaping provided by said S-shaping capacitance; and
   a resonant circuit for generating a generally sinusoidal oscillatory correction current during said line trace interval, said resonant circuit being coupled to said line deflection winding and tuned for generating an oscillatory correction current that is phased to produce a zero oscillatory correction current at both the beginning and end of said line trace interval for providing additional modification of the sawtooth trace current in accordance with said correction current.

14. An S-corrected line deflection circuit, comprising:

a line deflection winding;

an S-shaping capacitance coupled to said line deflection winding;

a trace switch coupled to said line deflection winding and operated at a line deflection rate for generating a trace current in said line deflection winding during a trace interval of a line deflection cycle, and a retrace current during a retrace interval, said trace current being a generally sawtooth current modified in accordance with the waveshaping provided by said S-shaping capacitance; and a resonant circuit tuned to generate a generally sinusoidal correction current during the line trace interval, said correction current having a frequency of oscillation which is a harmonic of the reciprocal of the trace interval, said resonant circuit being coupled to said line deflection winding for providing additional modification of the sawtooth trace current in accordance with said correction current.

15. An S-corrected line deflection circuit according to claim 1 characterized in that the retrace current from said line deflection winding rephases said correction current during said retrace interval to enable said correction current to be at substantially the zero current level at the beginning and end of said trace interval.

* * * * *

UNITED STATES PATENT AND TRADEMARK OFFICE
CERTIFICATE OF CORRECTION

PATENT NO. : 4,563,618

DATED : January 7, 1986

INVENTOR(S) : PETER EDUARD HAFERL

It is certified that error appears in the above-identified patent and that said Letters Patent is hereby corrected as shown below:

In the equation of Column 1, lines 44 and 45, delete the term on line 44 that reads "+A-"; and in line 45 delete the term "$_6Y^4 + A_7{}^2{}_4$" and substitute therefor the term  $+A_6Y^4 + A_7X^2Y^4$ .

Signed and Sealed this

Eighteenth Day of November, 1986

*Attest:*

DONALD J. QUIGG

*Attesting Officer*  *Commissioner of Patents and Trademarks*